No. 783,074. PATENTED FEB. 21, 1905.
C. E. RHOADES.
BISCUIT MOLDING MACHINE.
APPLICATION FILED MAY 21, 1904.
2 SHEETS—SHEET 1.
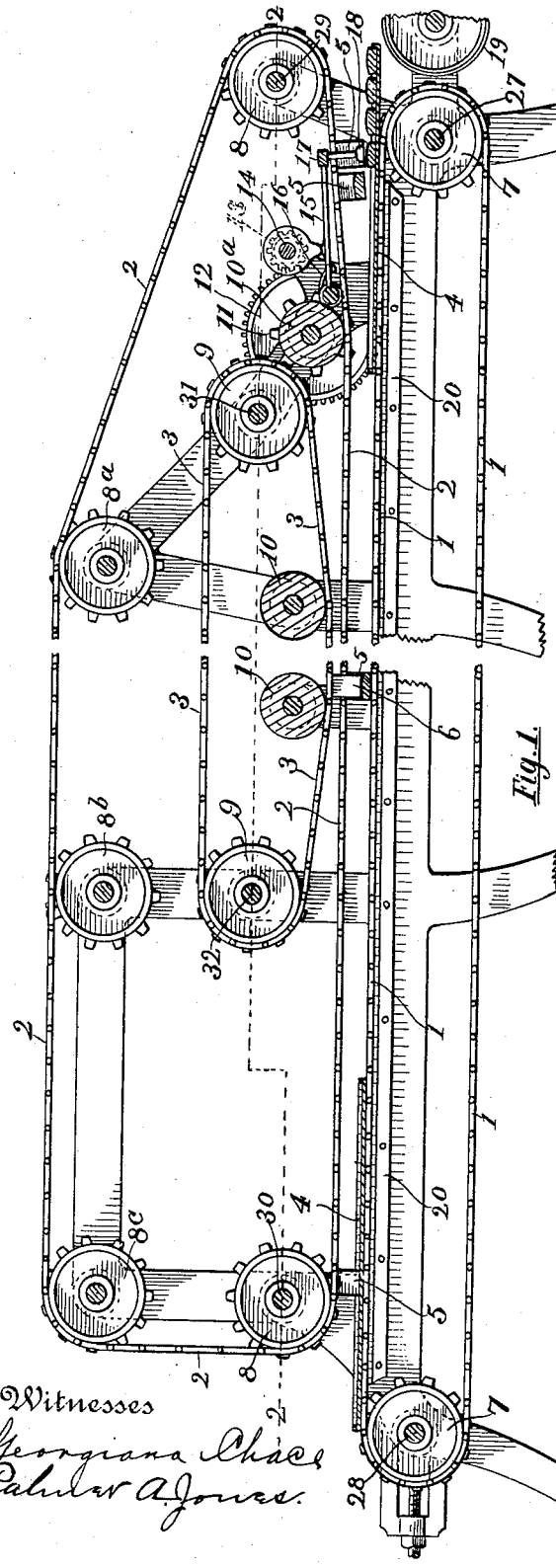
Witnesses
Georgiana Chace
Palmer A. Jones.
Inventor
Charles E. Rhoades
By Luther V. Moulton
Attorney No. 783,074. PATENTED FEB. 21, 1905.
C. E. RHOADES.
BISCUIT MOLDING MACHINE.
APPLICATION FILED MAY 21, 1904.
2 SHEETS—SHEET 2.
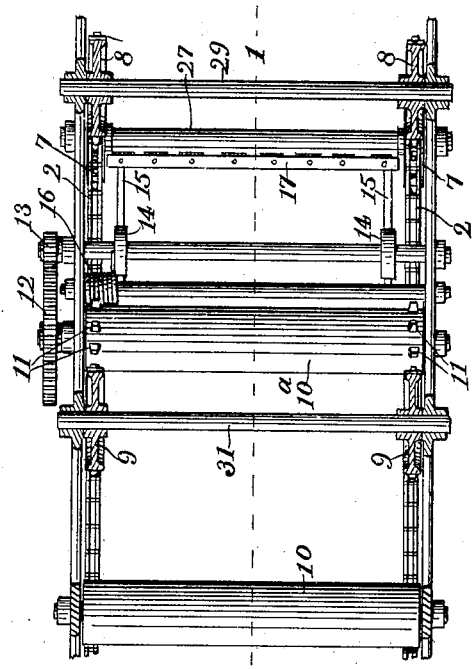
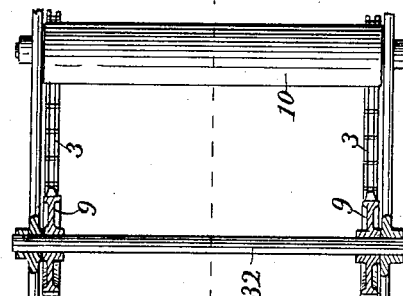
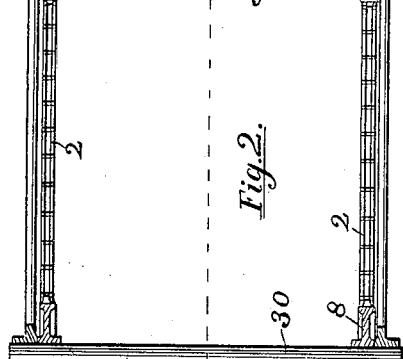
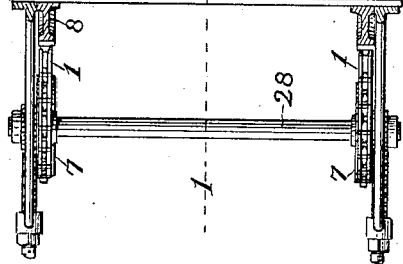
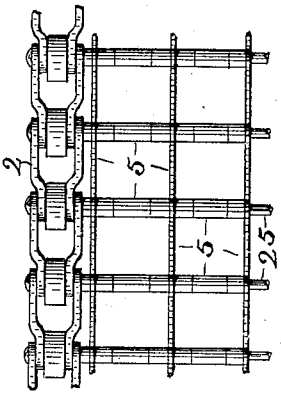
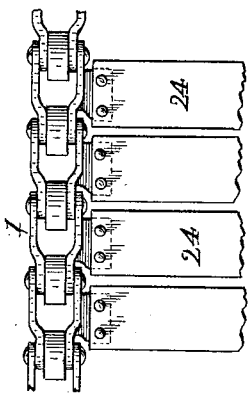
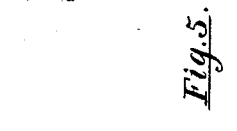
Witnesses
Georgiana Chase
Palmar A. Jones.
Inventor
Charles E. Rhoades
By Luther V. Moulton.
Attorney No. 783,074.

Patented February 21, 1905.

UNITED STATES PATENT OFFICE.

CHARLES E. RHOADES, OF BATTLECREEK, MICHIGAN, ASSIGNOR OF ONE-HALF TO CLARENCE G. VARY, OF BATTLECREEK, MICHIGAN.

BISCUIT-MOLDING MACHINE.

SPECIFICATION forming part of Letters Patent No. 783,074, dated February 21, 1905.

Application filed May 21, 1904. Serial No. 209,099.

*To all whom it may concern:*

Be it known that I, CHARLES E. RHOADES, a citizen of the United States, residing at Battlecreek, in the county of Calhoun and State of Michigan, have invented certain new and useful Improvements in Biscuit-Molding Machines; and I do hereby declare the following to be a full, clear, and exact description of the invention, such as will enable others skilled in the art to which it appertains to make and use the same.

My invention relates to improvements in machines for molding plastic material, and more particularly in machines for molding biscuits of flaked and malted food; and its object is to provide a machine for molding said biscuits and depositing the same on suitable trays or pans on which they are to be baked; and its object is to provide a simple and reliable machine for the purpose and having various new and useful features hereinafter more fully described, and particularly pointed out in the claims.

My invention consists, essentially, of certain modifications of construction and arrangement of the machine described and claimed in an application of even date herewith, Serial No. 209,100.

My device consists, essentially, of a machine comprising three carrying-chains at each side of the machine, portions of which are superposed one above the other, the lower chain adapted to carry the trays or pans, the middle chain adapted to carry suitable boxes or containers open at the top and bottom and adapted to receive the material to be operated upon, and the upper chain carrying suitable plungers for compressing the material within the boxes and upon the pans, and suitable pushers for releasing the molded biscuits from the boxes and depositing the same upon the pans, and means for operating the various chains and the pushers, as will more fully appear by reference to the accompanying drawings, in which—

Figure 1 is a vertical section of a device embodying my invention, showing the general arrangement of the chains, taken on the line 1 1 of Fig. 2; Fig. 2, a horizontal section of the same on the line 2 2 of Fig. 1; Fig. 3, an enlarged detail in vertical section; Fig. 4, a transverse section of the same on the line 4 4 of Fig. 3; Fig. 5, a plan view of one of the lower chains with the bed-plates attached thereto for carrying pans, and Fig. 6 a portion of one of the middle chains with connecting-rods and the boxes pivoted thereon.

Like numerals refer to like parts in all of the figures.

A chain 1 at each side of the machine extends horizontally around sprocket-wheels 7, mounted on the respective shafts 27 and 28. The upper part of this chain is supported horizontally by a suitable angle-iron 20 and provided with rolls traversing the same. Connecting the opposite links in these chains are bed-plates 24, upon which the pans 4 are carried, which pans receive the biscuits. The chain 2 at its lower side extends horizontally and a suitable distance above the chains 1 and is guided and supported between the angle-irons 21 and 22, which engage the upper and under sides of suitable rolls on the chain 2. Connecting these chains 2 are transverse rods 25, on which are supported and hinged suitable boxes 5, open at the top and bottom and adapted to receive the material to form the biscuits. These chains engage sprocket-wheels 8 on shafts 29 and 30, the shaft 29 at the discharge end of the machine being elevated above the plane of the pans a sufficient distance to raise the boxes clear of the top of the biscuits thereon. The chain 2 in its upper part extends upward over idlers $8^a$, $8^b$, and $8^c$ and is supported thereby, and within these chains are chains 3, engaging sprocket-wheels 9 on the shafts 31 and 32, so located as to bring the plungers 6 when opposite the same wholly above the respective boxes 5. These plungers are attached to suitable bed-plates 26, connected to the respective opposing links of the chains 3. The lower part of this chain is depressed, by means of suitable rolls 10, to force these plungers 6 downward within the boxes a sufficient distance to compress the material therein. When this chain 3 is in its lower position and the plungers suitably located to compress the biscuits, they are maintained in this relative position by rolls on the chains, which traverse between the angle-irons 22 and 23 and engage the same. As the chains 3 rise to pass around the wheels 9 on the shaft 31 these plungers 6 are withdrawn from the boxes, and as the chains 2 rise to pass around the wheels 8 on the shaft 29 the boxes are lifted away from the pans 4. As they are so lifted the biscuits therein are discharged therefrom by means of pushers 18, mounted on a bar 17, supported upon the movable ends of pivoted arms 15, which arms are raised by a spring 16 and depressed by cams 14, mounted on a shaft which is rotated by gears 12 and 13, which gears connect it to the roll $10^a$, having sprocket-teeth 11 engaging the chain 2. These gears are so proportioned that the cam makes one revolution to each link of the chain, and thus at the proper time depresses the pushers, as indicated in Fig. 1, and discharges the biscuits from a row of boxes and deposits them upon the pan below. These chains 1, 2, and 3 are driven by any suitable mechanism, (not shown,) preferably substantially the same mechanism as shown in the application previously referred to for driving a corresponding set of three chains therein.

Having thus fully described my invention, what I claim, and desire to secure by Letters Patent, is—

1. The combination of a movable bed to support and carry pans, boxes open at top and bottom, and adapted to rest on the trays, plungers vertically movable in the boxes, sprocket-chains to simultaneously move the bed, the boxes and the plungers, and means for operating the sprocket-chains.

2. The combination of a movable bed adapted to support and carry pans, chains to move the bed, boxes open at top and bottom, transverse rods pivotally supporting the boxes, chains supporting the rods, plungers vertically movable in the boxes, chains supporting the plungers, a roll to depress the chains and plungers, and means for simultaneously moving the chains.

3. The combination of a pair of lower chains, bed-plates attached to the same to support the pans, rolls in said chains, tracks traversed by said rolls and supporting the chains, a middle chain, boxes open at the top and bottom and supported on the middle chain, means for raising the middle chain at the discharge end of the machine, pushers to discharge the contents of the boxes, means for vertically moving the pushers at intervals, an upper chain, plungers attached to the upper chain and adapted to enter the boxes, and rolls engaging the upper chain to depress the plungers.

4. The combination of three superposed pairs of chains having rolls, parallel angle-irons engaging the rolls of the respective chains to support the same in horizontal position, and to space them apart, pans supported by the lower chain, boxes open at the top and bottom and supported by the middle chain, plungers adapted to enter the boxes and supported by the upper chain, means for raising the upper chain at the discharge end of the machine, means for depressing the middle portion of the upper chain, pushers to discharge the contents of the boxes, a spring to raise the pushers, a cam to depress the pushers, means for operating the chains, and means for rotating the cam.

5. The combination of a pair of lower chains adapted to support and move a series of pans, a pair of chains above the lower chains, boxes open at the top and bottom and attached to the last-named chains, plungers adapted to enter the boxes and compress the contents thereof, means for operating the plungers, pushers adapted to enter the boxes, pivoted arms supporting the pushers, springs to raise the arms, cams mounted on a shaft and engaging the arms, a sprocket-wheel engaging one of the chains, and gears connecting the sprocket-wheel, and the cam-shaft to operate the same.

6. The combination of a pair of lower chains, bed-plates connecting the chains and adapted to support and carry pans, tracks supporting the chains in horizontal planes, a pair of middle chains, rods connecting the middle chains, boxes open at the top and bottom and pivoted to the rods, a roll engaging the middle chains, sprocket-wheels on the rolls and engaging said chains, a cam-shaft geared to the roll, cams on the shaft, pivoted arms engaged by the cams, a bar supported by the arms, pushers adapted to enter the boxes, and attached to the bar, a pair of upper chains, transverse bars connecting said chains, plungers attached to the bars and adapted to enter the boxes, and means for depressing said chains and plungers.

7. The combination of a movable bed adapted to carry pans, means for moving the bed, boxes open at the top and bottom, means for placing the boxes on the pans and removing the same therefrom, plungers to enter the boxes and compress the material therein, means for operating the plungers, pushers for discharging the compressed material from the boxes, and means for operating the pushers.

In testimony whereof I affix my signature in presence of two witnesses.

CHARLES E. RHOADES.

Witnesses:
  W. C. OSBORNE,
  B. E. KING.